(12) United States Patent
Dufhaus

(10) Patent No.: US 7,325,674 B2
(45) Date of Patent: Feb. 5, 2008

(54) PLATE CONVEYOR HAVING RAPID ASSEMBLY DEVICE

(75) Inventor: Karl-Josef Dufhaus, Alpen (DE)

(73) Assignee: Aumund-Fördererbau GmbH & Co. KG, Rheinberg (DE)

( * ) Notice: Subject to any disclaimer, the term of this patent is extended or adjusted under 35 U.S.C. 154(b) by 0 days.

(21) Appl. No.: 10/593,926

(22) PCT Filed: Mar. 22, 2005

(86) PCT No.: PCT/EP2005/003015

§ 371 (c)(1),
(2), (4) Date: Sep. 21, 2006

(87) PCT Pub. No.: WO2005/095236

PCT Pub. Date: Oct. 13, 2005

(65) Prior Publication Data

US 2007/0218767 A1  Sep. 20, 2007

(30) Foreign Application Priority Data

Apr. 1, 2004 (DE) .................... 10 2004 016 059

(51) Int. Cl.
*B65G 29/00* (2006.01)
(52) U.S. Cl. ................ 198/867.14; 198/867.15; 198/851
(58) Field of Classification Search ........... 198/867.14, 198/867.15, 850, 851
See application file for complete search history.

(56) References Cited

U.S. PATENT DOCUMENTS

| | | | | |
|---|---|---|---|---|
| 3,393,792 A * | 7/1968 | Virta | ................ | 198/851 |
| 3,545,597 A * | 12/1970 | Resener | ................ | 198/851 |
| 3,910,406 A * | 10/1975 | Pulver et al. | ................ | 198/833 |
| 4,267,922 A * | 5/1981 | Patin et al. | ................ | 198/851 |
| 4,518,077 A * | 5/1985 | Ronco et al. | ................ | 198/731 |
| 4,953,691 A * | 9/1990 | Janzen | ................ | 198/867.14 |
| 5,549,194 A * | 8/1996 | Dag | ................ | 198/845 |
| 5,601,182 A * | 2/1997 | Tidland | ................ | 198/692 |
| 5,857,558 A * | 1/1999 | Irvine | ................ | 198/803.2 |
| 5,988,364 A * | 11/1999 | Boyce et al. | ................ | 198/867.15 |
| 6,176,370 B1 * | 1/2001 | Davies | ................ | 198/867.15 |
| 6,315,108 B1 * | 11/2001 | Bootsman et al. | ................ | 198/690.1 |
| 6,318,546 B2 * | 11/2001 | Koegler | ................ | 198/867.14 |
| 6,471,041 B1 * | 10/2002 | Long et al. | ................ | 198/699.1 |

(Continued)

*Primary Examiner*—Joe Dillon, Jr.
(74) *Attorney, Agent, or Firm*—Robert W. Becker; Robert W. Becker & Associates

(57) ABSTRACT

A plate conveyor having overlapping plates and a plate-supporting sprocket chain composed of two parallel chain strands formed of inner link members and outer link members, facing ones of which are connected by link pins. The chain is in the form of at least two preassembled portions that are to be interconnected by terminal link segments. A first terminal link segment is comprised of two parallel, outwardly projecting terminal inner link members, with a plate connected to at least one of them. A second terminal link segment is formed by a terminal outer link member, one end of which is connected to a link pin. The terminal outer link member projects outwardly on one side of the second terminal link segment and is connected to a plate. An outer closure link member is disposed across from the terminal outer link member and has an end adapted to be placed on the link pin. Another end of the outer closure link member has a further link pin adapted to extend through both of the terminal inner link members as well as through the other end of the terminal outer link member.

3 Claims, 2 Drawing Sheets

U.S. PATENT DOCUMENTS

| | | | |
|---|---|---|---|
| 6,550,610 B2 * | 4/2003 | Rettore | 198/848 |
| 6,629,596 B2 * | 10/2003 | Teuber | 198/850 |
| 6,691,862 B1 * | 2/2004 | Mogens | 198/851 |
| 6,745,892 B2 * | 6/2004 | Taeger | 198/687.1 |
| 6,814,218 B2 * | 11/2004 | Nishihara | 198/465.1 |
| 6,851,549 B1 * | 2/2005 | Beringer | 198/867.15 |
| 6,945,388 B2 * | 9/2005 | Schumacher | 198/851 |
| 7,237,376 B1 * | 7/2007 | Shirley et al. | 59/84 |

* cited by examiner

PLATE CONVEYOR HAVING RAPID ASSEMBLY DEVICE

This specification for the instant application should be granted the priority date of Nov. 19, 2002, the filing date of the corresponding German patent application 102 54 049.7 as well as the priority date of 18 Nov. 2003, the filing date of the corresponding International patent application PCT/EP2003/012892.

BACKGROUND OF THE INVENTION

The present invention relates to a plate conveyor having identical plates that are supported by a sprocket chain and that in the conveying direction of the plate conveyor have their bases, as well as vertically extending side edges thereof, reciprocally overlap, whereby the sprocket chain is composed of two chain strands that are disposed parallel to one another and are each formed by a sequence of inner link members and outer link members, wherein facing ones of the inner link members and outer link members are connected by respective common link pins that extend through associated openings of the link members, and wherein the plates of the plate conveyor are secured to the successive inner link members and outer link members of at least one of the two chain strands.

A plate conveyor having the aforementioned features is described, for example, in DE 34 38 231 C2. A problem with such plate conveyors arises during assembly since the plate conveyors must be transported in pre-assembled portions to the place of use and must there be connected to one another to form the endless conveying strand that is required during operation.

It is therefore an object of the present invention to embody a plate conveyor having the aforementioned features in such a way that assembly as well as possibly disassembly can be carried out in a simple manner.

SUMMARY OF THE INVENTION

The basic concept of the invention is that for the manufacture of an endless conveying strand by connecting the terminal link segments of at least two preassembled portions of the plate conveyor, the first terminal link segment of the portion is comprised of two parallel, outwardly projecting inner link members with the plate secured thereon, and the second terminal link segment that is connected thereto is formed by a preassembled terminal outer link member that is connected at one end with the link pin of the second terminal link segment, projects outwardly on one side of the second terminal link segment, and has the associated plate, and that a chain link member that is disposed across from the terminal outer link member is embodied as an outer closure link member, one end of which can be placed on the link pin of the second terminal link segment that carries the terminal outer link member, and with a link member that is preassembled on its other end extends through both of the outwardly projecting inner link members of the first terminal link segment as well as the end of the outwardly projecting terminal outer link member of the second terminal link segment.

The invention has the advantage that the individual portions of the plate conveyor can be substantially preassembled, and that to join together the terminal link segments of the portions of the plate conveyor that are to be interconnected, merely a single outer closure link member has to be installed in that chain strand of the two-stranded sprocket chain that initially is left incomplete on one side. If on the outwardly projecting terminal outer link member of the terminal link segment of one of the portions of the plate conveyor the associated plate with its side edges is already attached, a precise positioning of the plates already results, prior to the insertion of the outer closure link member, and during the joining together of the two terminal link segments of the portions of the plate conveyor, due to their reciprocal overlap, so that during the actual connecting assemblage via insertion of the outer closure link member, an exact alignment of the terminal link segments of the portions of the plate conveyor that are to be associated with one another is already provided.

Pursuant to one embodiment of the invention, the successive inner link members and outer link members of only one chain strand are provided with an angle bracket for the connection of an associated plate; in this case, the outer closure link member itself no longer has an angle bracket, so that it is not necessary to connect this outer closure link member with the associated plate.

If alternatively the inner link members and the outer link members of both of the chain strands that form the sprocket chain are provided with angle brackets for the connection of the associated plate, then after the insertion of the outer closure link member into the associated chain strand a subsequent connection must be made of the angle bracket provided on the pertaining outer closure link member with the plate.

BRIEF DESCRIPTION OF DRAWINGS

Embodiments of the invention, which will described subsequently, are shown in the drawing, in which.

DESCRIPTION OF SPECIFIC EMBODIMENTS

Figure 1:
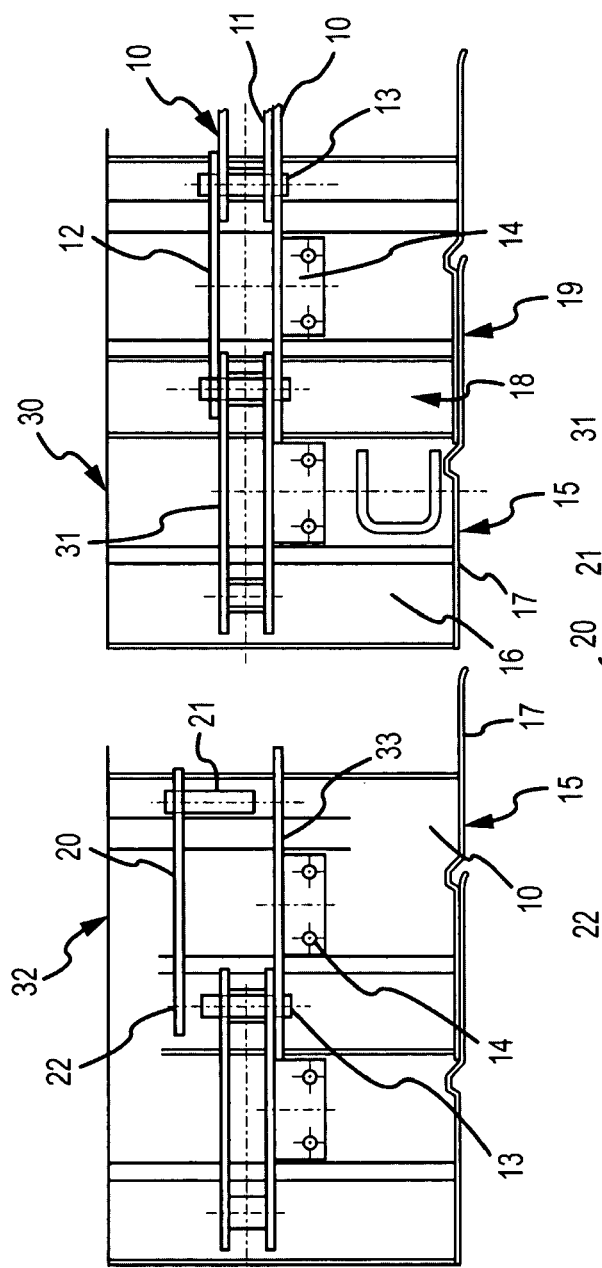
FIG. 1 shows two portions of a plate conveyor, including the pertaining outer closure link member, that are to be joined together, with the portions being shown in their separate starting position in a plan view onto the underside of the plate conveyor.

As can be seen initially from FIG. 1, the sprocket chain, which supports the individual plates 15 of the plate conveyor, comprises two parallel chain strands 10 that extend parallel to one another, whereby each chain strand is comprised of a sequence of inner link members 11 and outer link members 12. The respectively facing inner link members 11 and outer link members 12 are secured to each other by link pins 13 that extend through the link members in common in associated openings, whereby the link pins 13 are deformed with the link members 11, 12 that are set thereon. In the illustrated embodiment, the successively arranged inner link members 11 and outer link members 12 of a given one of the chain strands 10 are provided with brackets 14 to which are secured the plates 15 that form the plate conveyor. The plates 15 have a base 16 and laterally and vertically raised side edges 17, whereby the bases 16 and the side edges 17 of the individual plates 15 respectively overlap one another. However, there are differences in the dimensions between the bases 16 and the side edges 17 of each individual plate 15, so that the area of overlap 18 of the associated bases 16 is less than the area of overlap 19 of the side edges 17. The side edges 17 are additionally provided with impressings in order to form a sealing engagement against one another.

The right hand portion of a plate conveyor illustrated in FIG. 1 has a first terminal link segment 30, which is provided with two outwardly projecting inner link members 31 that are disposed in a parallel relationship and hence are associated with the two chain strands 10, whereby the inner link member 31 supports a plate 15; that inner link member 31 that pertains to the chain strand having the brackets 14 on which the link members 11, 12 are disposed is also provided with a bracket 14.

The oppositely disposed portion, which is illustrated on the left hand side of the drawing sheet and is to be connected with the right hand terminal link segment 30, is provided with a second terminal link segment 32, which is provided with a terminal outer link member 33 that is associated with only one chain strand 10, and one end of which is connected to the last link pin 13 of the terminal link segment 32 and thus projects freely outwardly, whereby this terminal outer link member 33 also supports an associated plate 15.

Furthermore illustrated in the drawing is the pertaining outer closure link member 20, one end of which has an opening 22 for placement upon the associated link pin 13 of the second terminal link segment 32 that is provided with the outwardly projecting outer link member 33, and that on its other end is provided with a pressed-on link pin 21 via which, after the two terminal link segments 30 and 32 have been moved together, the outer closure link member can be inserted into the outwardly projecting inner link members 31, whereby the link pin 21 also engages the free end of the outwardly projecting outer link member 33 and secures it in position.

Figure 2:
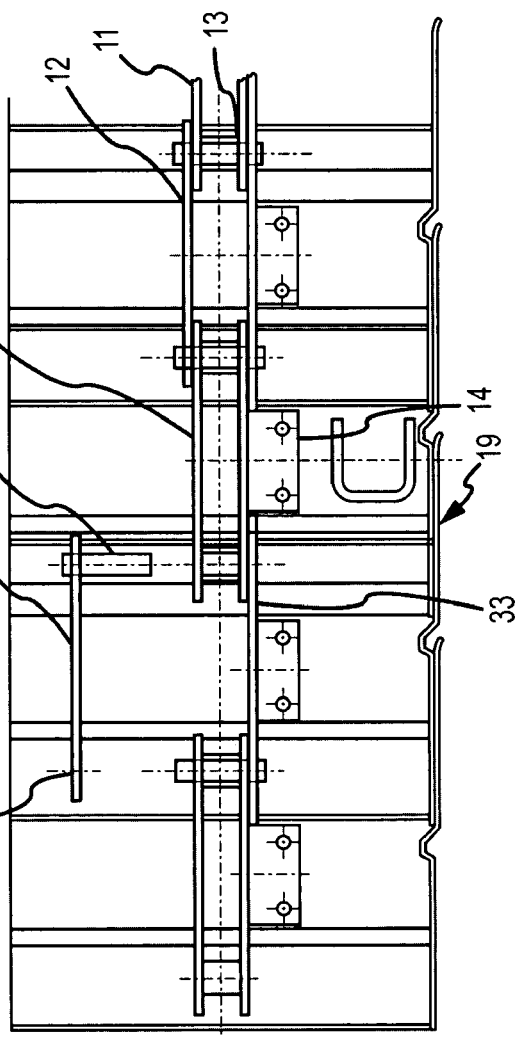
FIG. 2 shows the subject matter of FIG. 1 after the portions have been moved together and prior to the insertion of the outer closure link member.

FIG. 2 shows the state in which the two terminal link segments 30 and 32 are moved together into the position in which the outer closure link member 20 can be inserted in such a way that the opening 22 can be placed upon the link pin 13 of the second terminal link segment 32, and the pressed-on link pin 21 of the outer closure link member 20 can be inserted into the aligned openings of the outwardly projecting inner link members 31 of the first terminal link segment 30 and the outwardly projecting outer link member 33 of the second terminal link member 32. In this position illustrated in FIG. 2, the bases 16 and the side edges 17 of the respective plates 15 of the two terminal link segments 30 and 32 are moved together into their overlapping positions so that prior to insertion of the outer closure link member 20, there already results a precise fixation of the terminal link segments 30 and 32 relative to one another, with this fixation enabling an alignment of the associated areas of overlap 18 and 19.

Figure 3:
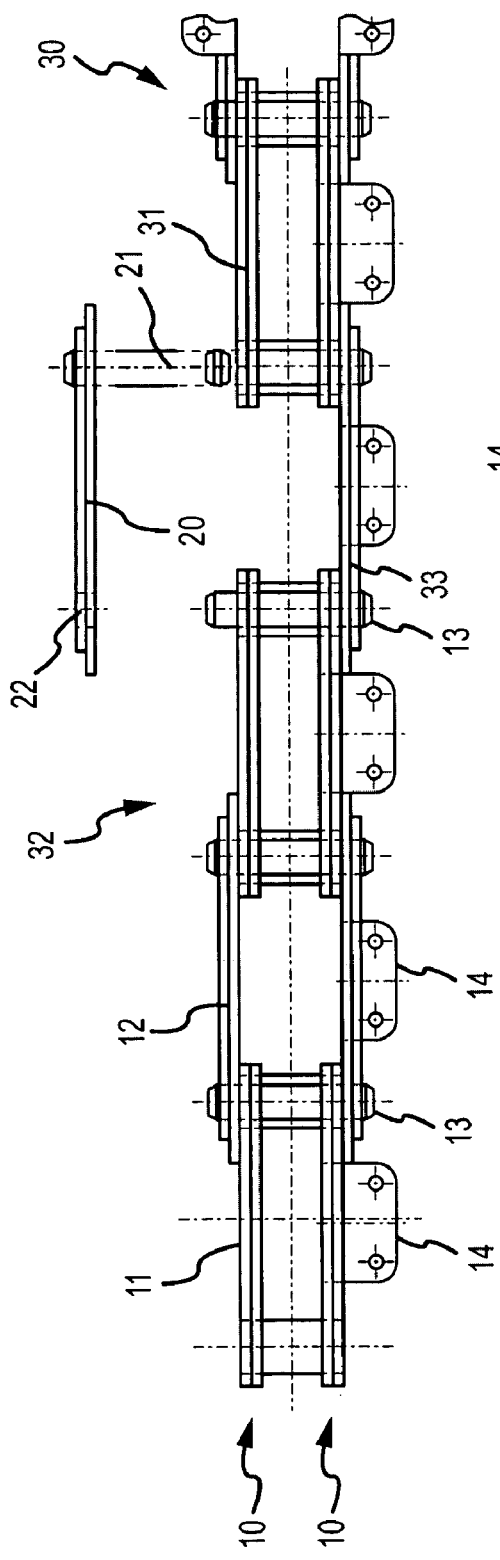
FIG. 3 is an isolated illustration of the sprocket chain of FIG. 2 with angle brackets on one side.
Figure 4:
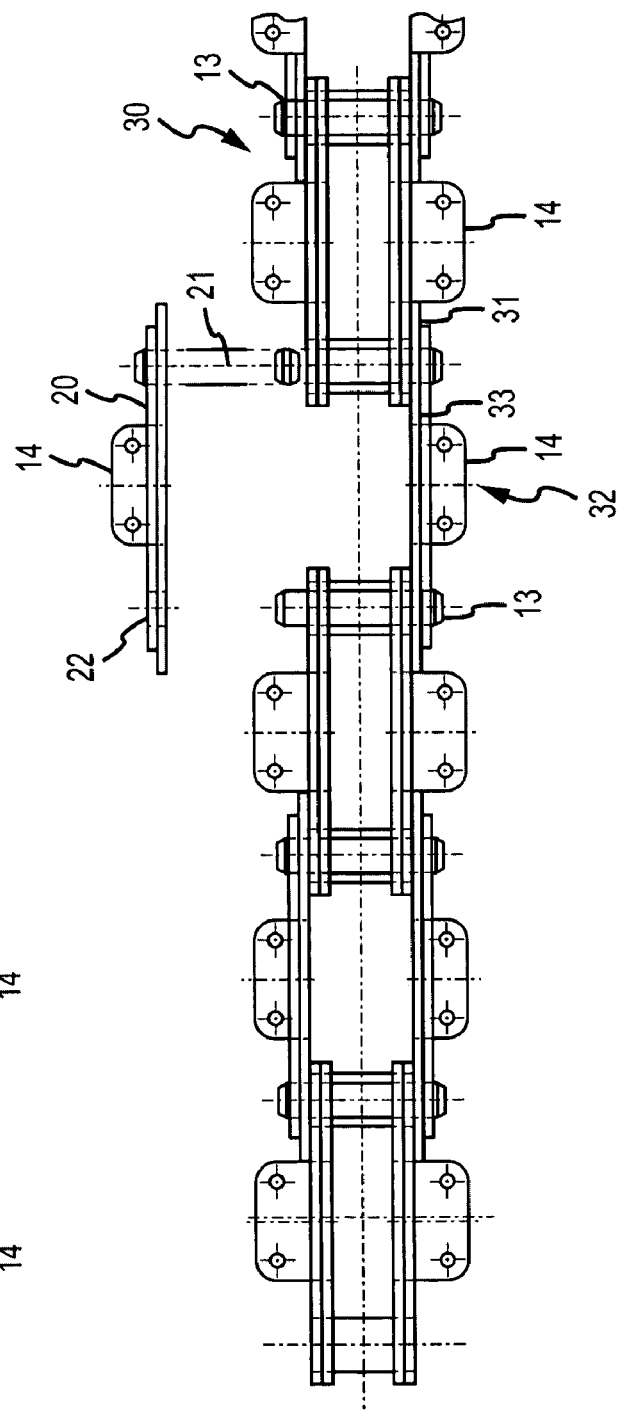
FIG. 4 shows the subject matter of FIG. 3 with angle brackets disposed on both sides.

A state that corresponds to the state illustrated in FIG. 2 is illustrated in FIGS. 3 and 4 with regard to the associated chain strands 10, whereby the configuration of the chain strands 10 of FIG. 3 corresponds to the arrangement in FIG. 2, with angle brackets 14 disposed on one side. With the embodiment illustrated in FIG. 4, the inner link members 11 and outer link members 12 of both chain strands 10 are each provided with angle brackets 14; the same is also true for the outer closure link member 20, so that after the terminal link segments 30 and 32 have been moved together, and the outer closure link member 20 has been inserted into the associated chain strand 10, the pertaining angle bracket 14 of the outer closure link member 20 is to be connected with the plate 15 disposed thereabove. Due to the preliminary fixation during the moving together of the terminal link segments 30 and 32, the subsequent connection of the outer closure link member 20 with the pertaining plate 15, however, no longer represents a complicated or expensive assembly step.

The features of the subject matter of these documents disclosed in the preceding specification, the patent claims, the abstract and the drawing can be important individually as well as in any desired combination with one another for realizing the various embodiments of the invention.

The specification incorporates by reference the disclosure of German priority document 10 2004 016 059.7 filed Apr. 1, 2004 and PCT/EP2005/003015 filed Mar. 22, 2005.

The present invention is, of course, in no way restricted to the specific disclosure of the specification and drawings, but also encompasses any modifications within the scope of the appended claims.

The invention claimed is:

1. A plate conveyor having identical plates, wherein when viewed in a conveying direction of the conveyor, bases of said plates, as well as vertically extending side edges of said plates, reciprocally overlap, the plate conveyor further comprising:

a sprocket chain that supports said plates and is composed of two chain strands that are disposed parallel to one another and are each formed by a sequence of inner link members and outer link members, wherein facing ones of said inner link members and said outer link members of respective strands are connected by respective common link pins that extend through associated openings of said plates inner and outer link members, wherein said plates are secured to successive ones of said inner and outer link members of at least one of said chain strands, and wherein said sprocket chain is in the form of at least two preassembled portions that are adapted to be interconnected to form an endless conveying strand;

a first terminal link segment of said chain strands of at least two preassembled portions, wherein said first terminal link segment is comprised of two parallel, outwardly projecting inner terminal link members, and wherein one of said plates is connected to at least one of said terminal inner link members;

a second terminal link segment that is adapted to be connected to said first terminal link segment and is formed by a terminal outer link member, wherein one end of said terminal outer link member is connected to one of said link pins that connects said second terminal link segment to a non-terminal one of said inner and outer link members, and wherein said terminal outer link member projects outwardly on one side of said second terminal link segment and is connected to one of said plates; and an outer closure link member that is disposed across from said terminal outer link member, wherein one end of said outer closure link member is adapted to be placed on said link pin that connects said second terminal link segment to a non-terminal one of said inner and outer link members, wherein another end of said outer closure link member is provided with a further link pin that is adapted to extend through both of said terminal inner link members of said first terminal link segment as well as through another end of said terminal outer link member of said second terminal link segment.

2. A plate conveyor according to claim 1, wherein the successively arranged inner link members and outer link members of only one of said chain strands are provided with a respective bracket for connection of an associated one of said plates.

3. A plate conveyor according to claim 1, wherein said inner link members and said outer link members of both of said chain strands of said sprocket chain are provided with brackets for connection of associated ones of said plates.

* * * * *